(12) United States Patent
Kaneko et al.

(10) Patent No.: US 7,595,575 B2
(45) Date of Patent: Sep. 29, 2009

(54) MOTOR/GENERATOR TO REDUCE COGGING TORQUE

(75) Inventors: Yutaro Kaneko, Yokohama (JP); Hiroyuki Nakayama, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/490,291

(22) Filed: Jul. 20, 2006

(65) Prior Publication Data

US 2007/0018520 A1    Jan. 25, 2007

(30) Foreign Application Priority Data

Jul. 21, 2005    (JP) .............................. 2005-211282

(51) Int. Cl.
*H02K 7/20*    (2006.01)
(52) U.S. Cl. ........................ 310/112; 310/114; 310/268
(58) Field of Classification Search ............ 310/156.35, 310/156.33, 156.32, 156.44, 156.45–156.48, 310/156.64–156.65, 268, 90.5, 216, 112, 310/114
See application file for complete search history.

(56) References Cited

U.S. PATENT DOCUMENTS

| | | | | |
|---|---|---|---|---|
| 1,908,880 A | * | 5/1933 | Bethenod | 310/163 |
| 3,441,763 A | * | 4/1969 | Patrignani | 310/179 |
| 4,095,150 A | * | 6/1978 | Senckel | 310/12 |
| 4,180,743 A | * | 12/1979 | Lacroix | 290/38 B |
| 4,187,441 A | * | 2/1980 | Oney | 310/112 |
| 5,212,419 A | * | 5/1993 | Fisher et al. | 310/254 |
| 5,955,809 A | * | 9/1999 | Shah | 310/198 |
| 6,011,337 A | * | 1/2000 | Lin et al. | 310/156.37 |
| 6,114,788 A | * | 9/2000 | Vuillemin (Muller) et al. | 310/90.5 |
| 6,373,162 B1 | * | 4/2002 | Liang et al. | 310/156.53 |
| 2004/0090134 A1 | * | 5/2004 | Ide et al. | 310/112 |
| 2005/0179336 A1 | * | 8/2005 | Hasebe et al. | 310/268 |
| 2006/0022552 A1 | * | 2/2006 | Zhu et al. | 310/268 |

FOREIGN PATENT DOCUMENTS

| | | |
|---|---|---|
| CN | 1459909 A | 12/2003 |
| CN | 1543037 A | 11/2004 |
| JP | 2000-333391 | 11/2000 |
| JP | 2003-125566 | 4/2003 |

* cited by examiner

*Primary Examiner*—Quyen Leung
*Assistant Examiner*—Alex W Mok
(74) *Attorney, Agent, or Firm*—Global IP Counselors, LLP

(57) ABSTRACT

The disclosure is directed to a motor/generator including a magnetic circuit that is created between a rotor and stator through a first air gap and a second air gap so that a magnetic field (magnetic flux) passes through two parts of the edges of multiple stator teeth parts. A first protruding end part and a second protruding end part of the stator teeth parts which face each air gap may contain different shapes with regard to the circumferential direction of the rotor. These shapes and orientation of the first and second protruding end parts may reduce the cogging torque of the motor/generator.

18 Claims, 8 Drawing Sheets

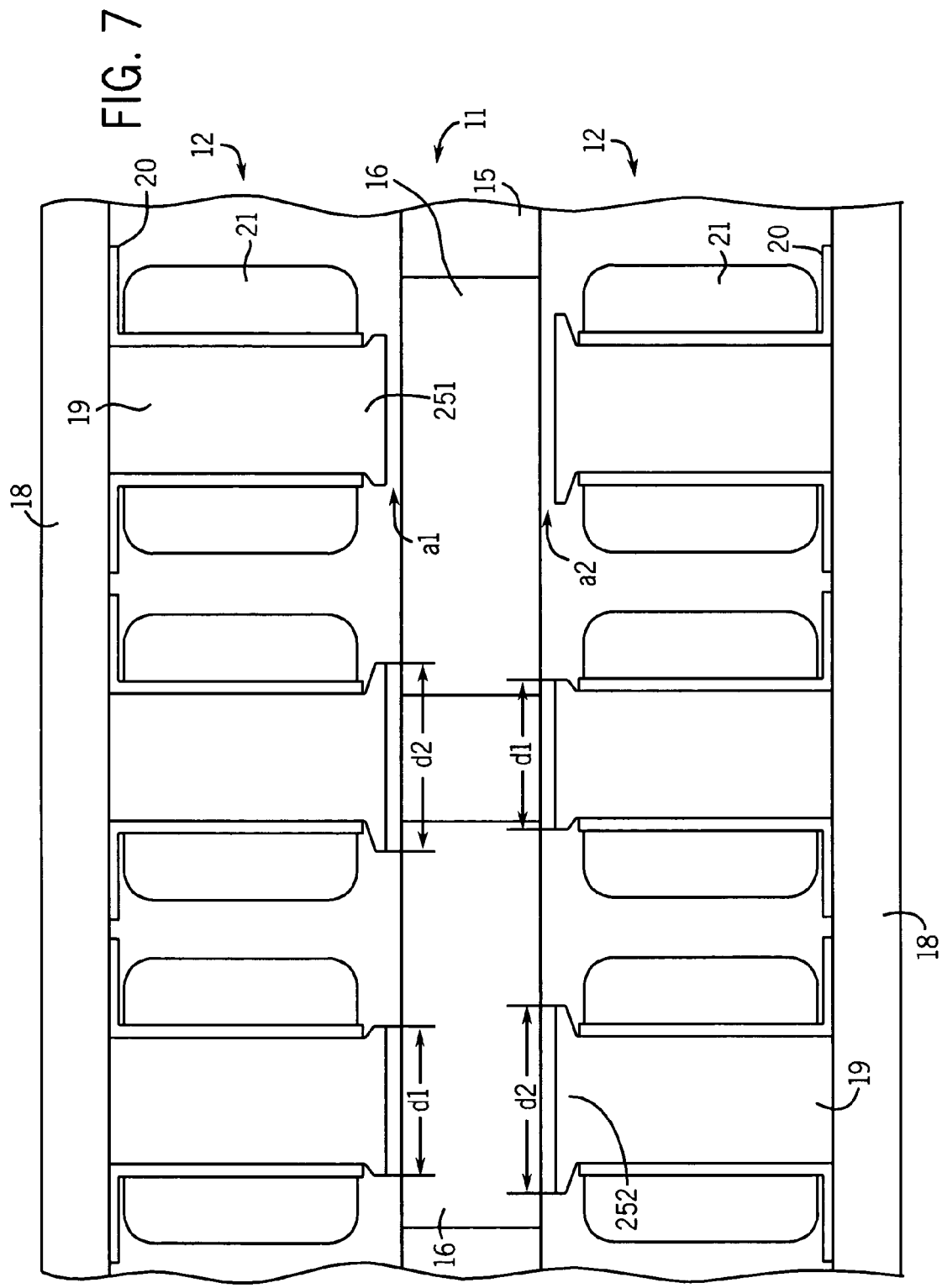

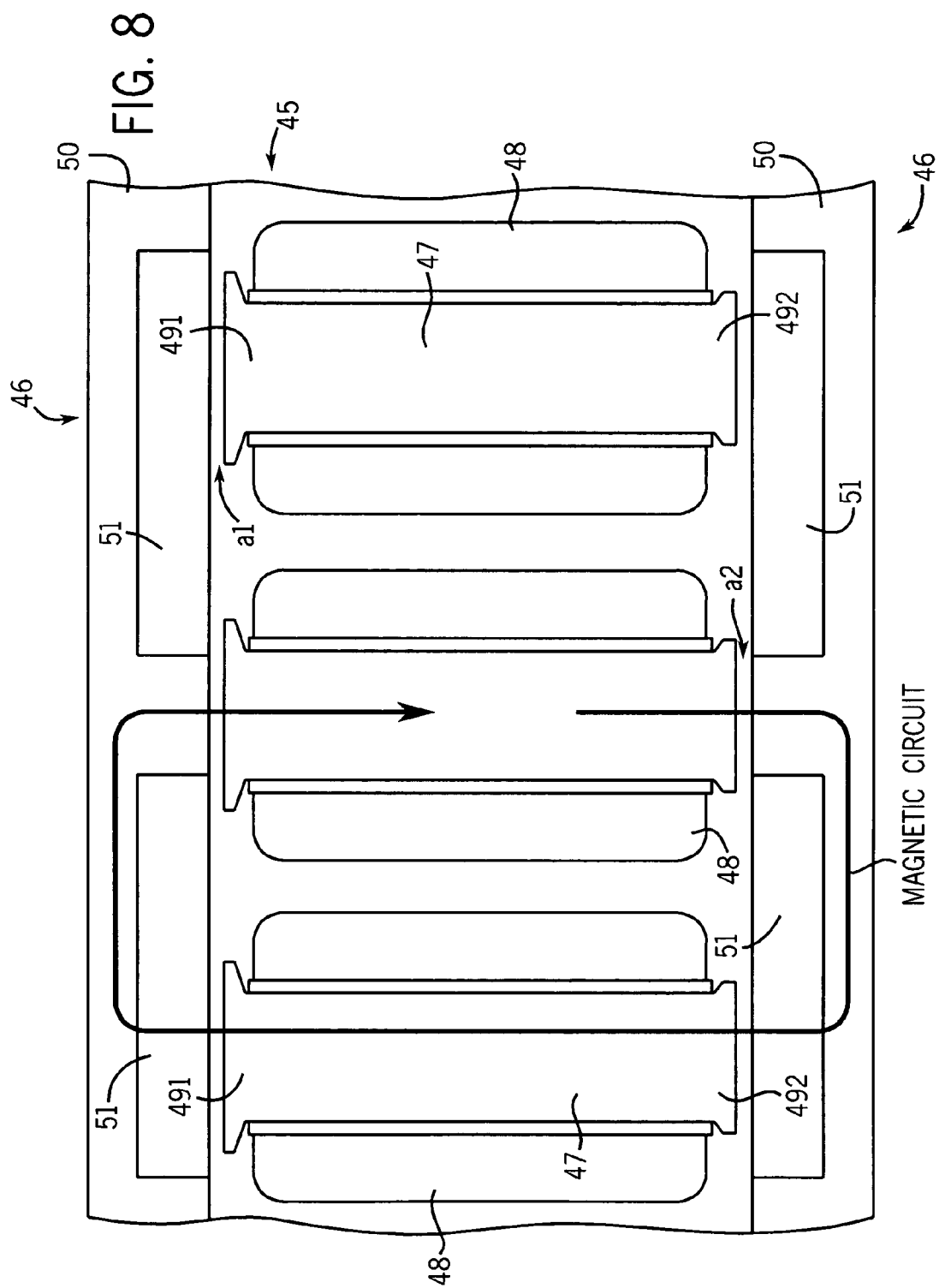

MOTOR/GENERATOR TO REDUCE COGGING TORQUE

This application claims priority from Japanese Patent Application No. 2005-211282, filed Jul. 21, 2005, the entire contents of which is incorporated herein by reference.

TECHNICAL FIELD

The invention relates to a motor or generator, or more specifically, to a stator of a motor or generator.

BACKGROUND

Conventionally, a motor having a structure where a rotor is loaded with a permanent magnet is known. Since the motor with the above described structure is efficient, less easily damaged and may have large output, the motor with a permanent magnet is widely used. In the above described permanent magnet-type motor, generation of "cogging torque" is inevitable. For example, a motor with a large cogging torque, when rotated at high speed, produces vibration and noises.

SUMMARY

In general, the invention is directed to a motor/generator which can obtain a significant effect of decreasing the cogging torque without increasing the size of the motor/generator and its cost.

In accordance with the invention to decrease the cogging torque of the motor/generator, the stator of the motor/generator in the present invention creates a magnetic circuit through a first air gap and a second air gap which are placed on different surfaces between the stator and the rotor. The magnetic field passes through two points of the end of the stator teeth part and a first end protruding part which faces the air gap of the stator teeth part and a second end protruding part which faces the second air gap are made in different shapes in the circumferential direction of the rotor. As a result, it is possible to obtain a significant effect of decreasing the cogging torque without increasing the size and cost of the motor/generator.

In one embodiment, the invention is directed to a motor/generator that includes one or more rotors having a permanent magnet and one or more stators. The one or more stators include a stator teeth part that has a first protruding end part that faces a first air gap and a second protruding end part that faces a second air gap and has a shape in a circumferential direction of the one or more rotor that is different from a shape of the first protruding end part in the circumferential direction of the one or more rotors. In addition, the motor/generator includes a coil mounted on the stator teeth part that creates a magnetic circuit via a magnetic field generated by the permanent magnet and the coil, wherein the one or more stators create the magnetic circuit through a first air gap and second air gap disposed in different surfaces between the one or more rotors and the one or more stators so that the magnetic field passes through two parts of edges of the stator teeth part.

In another embodiment, the invention is directed to a method for generating a magnetic field that includes rotating one or more rotors separated from one or more stators by a first air gap and a second air gap disposed in different surfaces between the one or more rotors and the one or more stators, wherein a first protruding end part that faces the first air gap and a second protruding end part that faces the second air gap and has a shape in the circumferential direction of the one or more rotor that is different from a shape of the first protruding end part in the circumferential direction of the one or more rotors. The method also includes creating a magnetic circuit with a coil mounted on a stator teeth part of one or more stators and a permanent magnet of one or more rotors via a magnetic field generated by the permanent magnet and the coil, wherein the magnetic circuit is created through the first and second air gaps.

In an alternative embodiment, the invention is directed to a motor/generator that includes means for creating a magnetic field comprising a stator teeth part and a coil mounted on the stator teeth part, wherein the coil creates a magnetic circuit by a magnetic field generated by the permanent magnet and the coil. The stator means creates the magnetic circuit through a first air gap and second air gap placed in different surfaces between the rotor means and the stator means so that the magnetic field passes through two parts of edges of the stator teeth part. The motor/generator also includes means for reversing waveforms disposed on each edge of the stator teeth part such that waveforms of the cogging torque of each of the protruding end parts are reversed by each of the air gaps.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 7 is a development view illustrating a part of the stators which are placed on both sides of the rotors of the motor/generator of Embodiment 4 of the present invention.

FIG. 8 is a development view illustrating a part of the stators which are placed on both sides of the rotors of the motor/generator of Embodiment 5 of the present invention.

DETAILED DESCRIPTION

Figure 1:
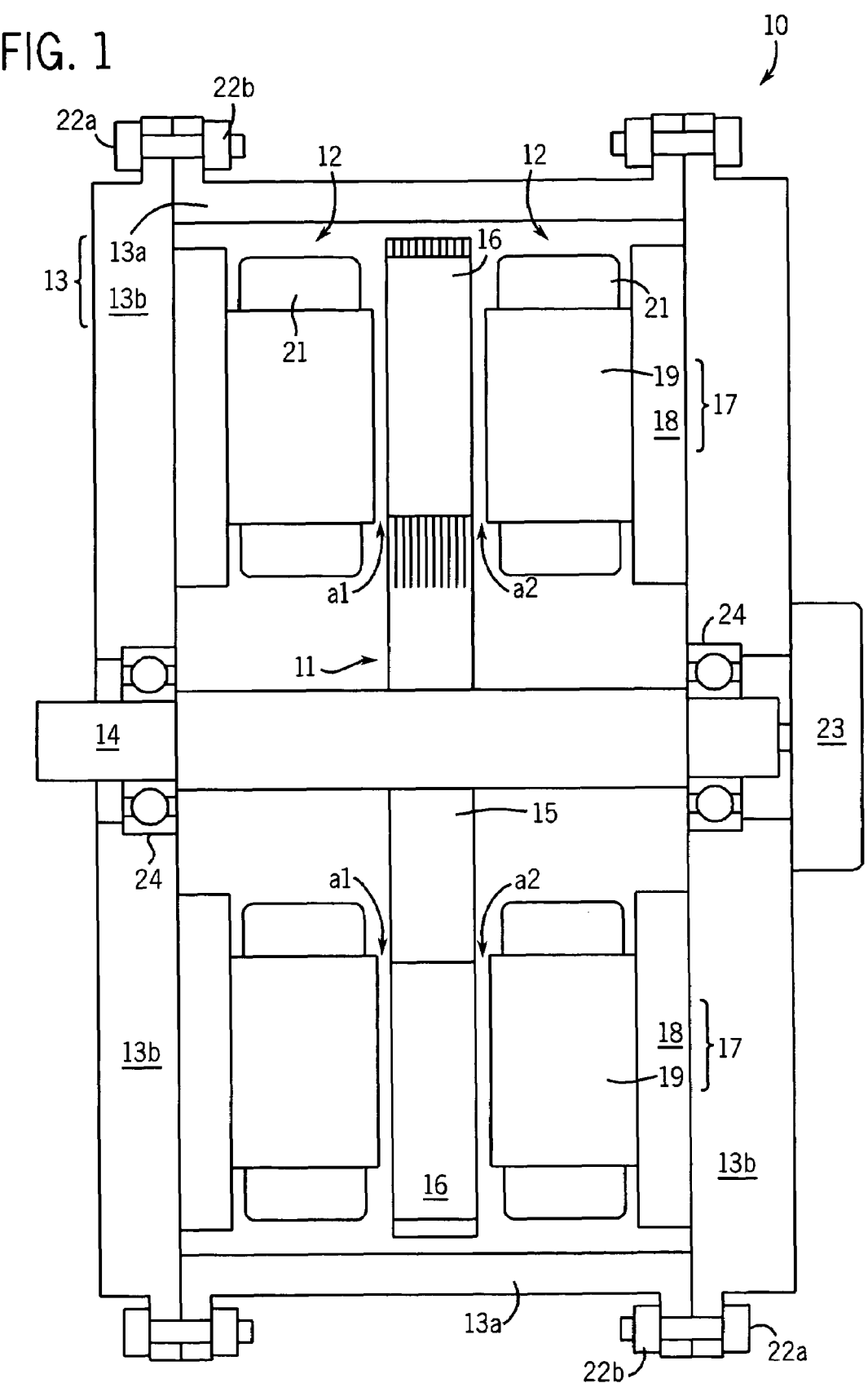
FIG. 1 is a cross-sectional view illustrating the motor/generator in the axial direction of the stators.

The preferred embodiments of the present invention are described by referring to the drawings below. Other embodiments remain within the scope of the invention, which are not limited to the FIGS. provided herein.

Figure 2:
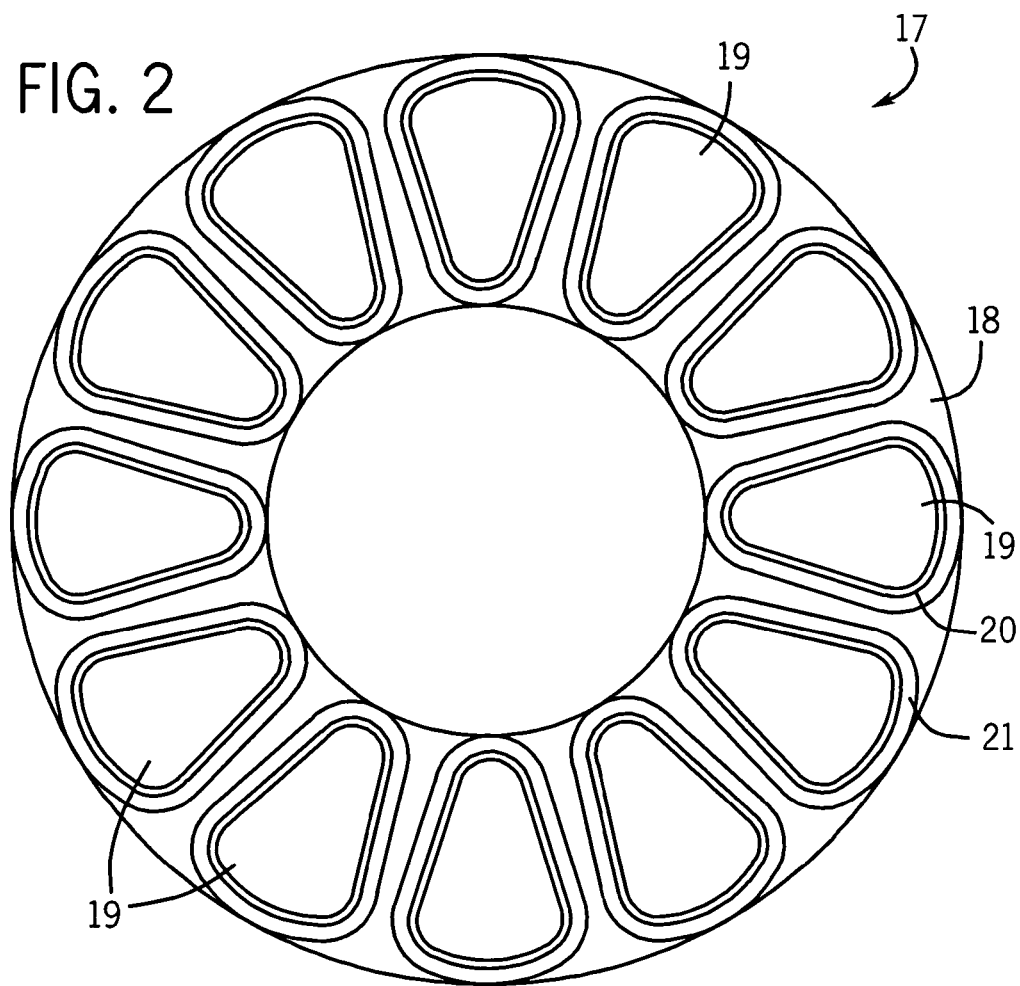
FIG. 2 is a cross-sectional view illustrating the stator of FIG. 1 in a direction perpendicular to the axial direction of the stator.

FIG. 1 is a cross-sectional view of a first embodiment illustrating the motor/generator in the axial direction of the stators. FIG. 2 is a cross-sectional view illustrating the stator of FIG. 1 in a direction perpendicular to the axial direction of the stator. As shown in FIG. 1, motor/generator 10 has a pair of stators 12, which are placed in the opposed positions on both sides of rotor 11, and case 13. The surfaces of rotor 11 and the pair of stators 12 which face each other are placed in a direction perpendicular to the center axial direction of rotating axis 14 thereby creating an axial gap structure. Stator 12, rotor 11, and corresponding components therein may also be referred to as means for creating a magnetic field.

Rotor 11 has disc-shaped rotor core 15 where rotating axis 14 passes through the center of the disc surface, and a plurality of permanent magnets 16 which are placed on rotor core 15. Stators 12 have respectively stator cores 17 which are made of ferromagnetic material, for example, magnetic steel sheet. As shown in FIG. 2, stator core 17 is made of back core part 18 which is made from a toric disc body and a plurality of stator teeth parts 19 which are protruding from and placed on the surface of back core part 18 at almost equal intervals. Coil 21 is wound around (placed on) each stator teeth part 19 through insulating material 20.

As shown in FIG. 1, case 13 has cylindrical outer circumferential case 13a and a pair of side cases 13b which seal both of the openings of outer circumferential case 13a. Outer circumferential case 13a and each side case 13b are mounted by bolts 22a and screw nuts 22b through flange-shaped mounting parts. Also, rotating sensor 23, which detects the rotating state of rotating axis 14, is placed on the outer surface of one of side cases 13b.

Rotating axis 14 is rotatably placed in both of side cases 13b through bearing 24. Rotor 11 rotates around rotating axis 14 by a reaction force which is generated by permanent magnets 16 in the rotating magnetic field (rotating magnetic flux) produced by the pair of stators 12. Permanent magnets 16 are placed so that the adjacent permanent magnets 16 are different from each other. There are first air gap a1 and second air gap a2 between rotor 11 and each stator 12 and they do not contact with each other (see FIG. 1).

Figure 3:
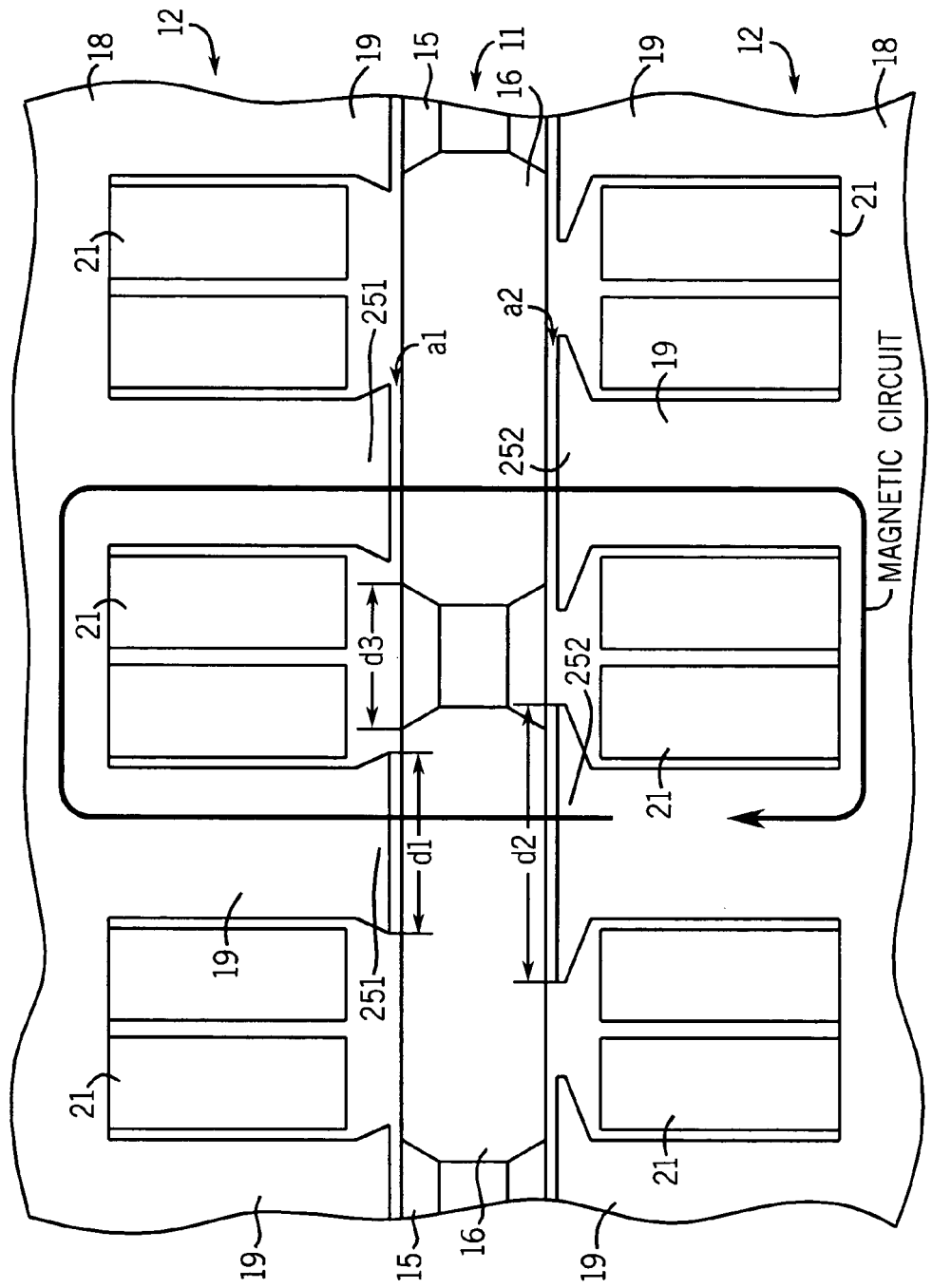
FIG. 3 is a development view illustrating a part of the stators which are placed on both sides of a rotor.

FIG. 3 is a development view illustrating a part of the stators which are placed on both sides of the rotor. As shown in FIG. 3, each stator teeth part 19 of the pair of stators 12 which are located on both sides of rotor 11, wherein coil 21 is wound around, has outward-looking flange-shaped first protruding end part 251 with an enlarged diameter of the end surface. The first protruding end part 251 is created on the end surface in the side of first air gap a1. Also, each stator teeth part 19 has outward-looking flange-shaped first protruding end part 252 with an enlarged diameter of the end surface. The second protruding end part 252 is created on the end surface in the side of second air gap a2. The pair of stators 12 creates a magnetic circuit shown in FIG. 3 from a magnetic field (magnetic flux) which is generated by permanent magnet 16 of rotor 11 and a rotating magnetic field (rotating magnetic flux) which is generated by coil 21. In the above described magnetic circuit, the magnetic flux passes through first protruding end part 251, rotor 11 and second protruding end part 252 through first air gap a1 and second air gap a2 which are placed on the opposite surfaces.

Each stator teeth parts 19 of the pair of stators 12 which are placed opposite to each other on both sides of rotor 11, that is, stator teeth parts 19 which are placed opposite to each other facing each air gap a1 and a2, is placed so that the center lines of each stator teeth part 19 become identical. At the same time, the widths of first protruding end part 251 and second protruding end part 252 of each stator teeth part 19, that is, the teeth widths are different in the circumferential direction of the stator core (circumferential direction of the rotor). In other words, teeth width d1 of first protruding end part 251 of one stator teeth part 19 is made narrower than teeth width d2 of second protruding end part 252 of the other stator teeth part 19. As a result, although each stator teeth part 19 which is placed opposite to each other on both sides of rotor 11 has the same shape in each of air gaps a1 and a2 in the side of each stator 12, each of protruding end parts 251 and 252 which face each other have different shapes. Different shapes or alignment of stator teeth parts 19 are means for reducing waveforms, e.g., reducing cogging torque.

As described above, since first protruding end part 251 which faces first air gap a1 of one of stators 12 is shaped differently from second protruding end part 252 which faces second air gap a2 of the other stator 12, it is possible to adjust the waveform of the cogging torque. Each stator teeth part 19 is placed so that the center lines of each stator teeth part 19 facing each other are made identical, the electric current phase which passes through a pair of coils 21 which are wound by each stator teeth part 19 facing each other is made identical. As a result, it is possible to prevent decrease of the torque of the motor/generator. Since each stator teeth part 19 has the same shape in each of air gaps a1 and a2 in the side of each stator 12, it is possible to simplify the structure and lower the cost.

Figure 4:
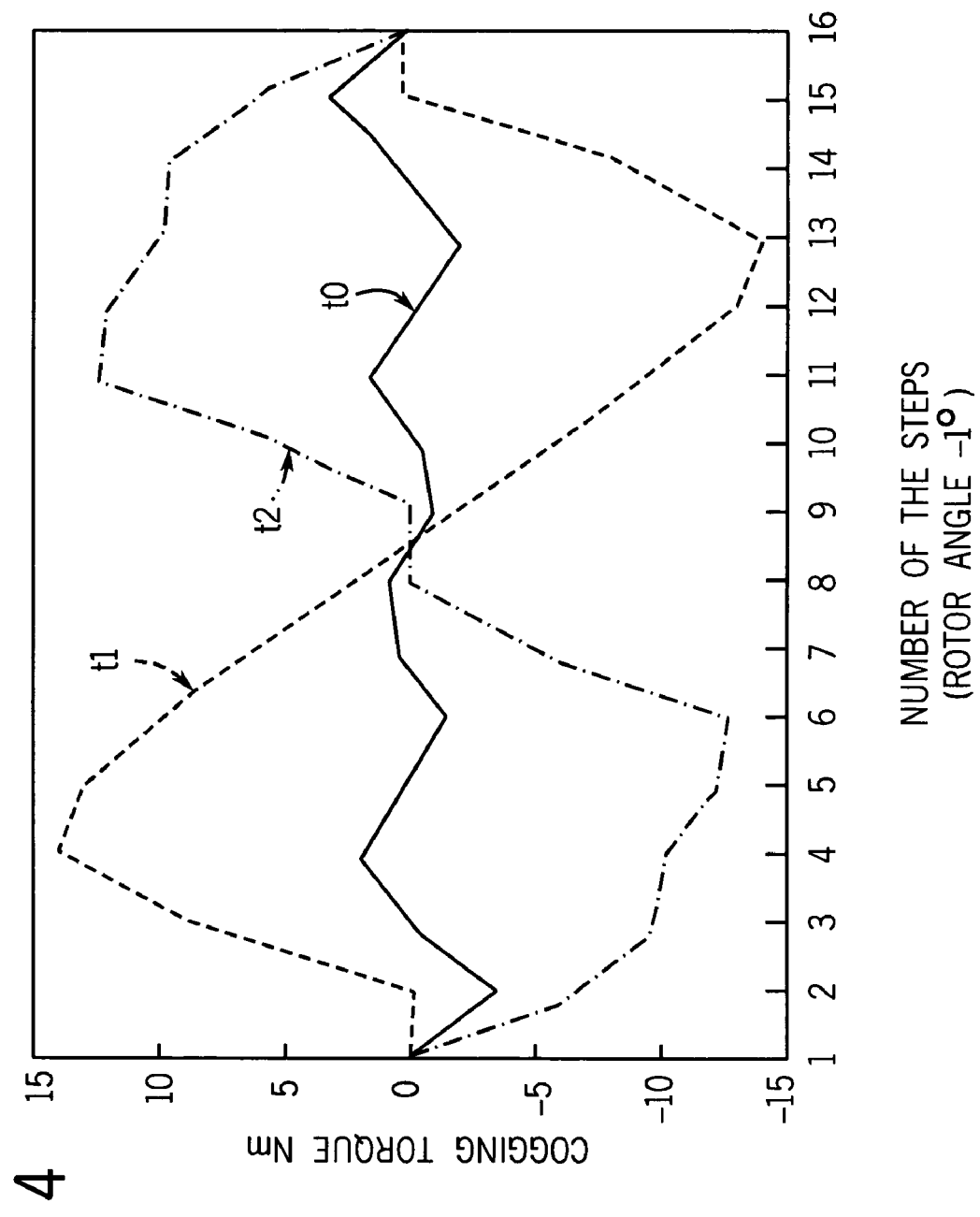
FIG. 4 is a graph indicating each cogging torque of a pair of the stators and the total cogging torque.

FIG. 4 is a graph indicating each cogging torque of a pair of the stators and the total cogging torque. As shown in FIG. 4, cogging torque t1 of one of stators 12 offsets cogging torque t2 of the other one of stators 12 and total cogging torque t0 of cogging torque t1 and cogging torque t2 is much smaller than cogging torque t1 or cogging torque t2. In other words, first protruding end part 251 which faces first air gap a1 in the side of one of stators 12 and second protruding end part 252 which faces second air gap a2 in the side of the other one of stators 12 are shaped differently (reversing means) so that the waveforms of the cogging torques are reversed. As a result, it is possible to offset the cogging torque thereby decreasing the cogging torque.

As for distance d3 between adjacent permanent magnets 17 of rotor 11 (see FIG. 3) and teeth widths d1 and d2 of protruding end part 25, for example, when the range of air gap a1 in the side of each stator 12 is 0.5>(d3/d1) and the range of air gap a2 is 0.5<(d3/d2), the waveform of the cogging torque can be reversed.

Figure 5:
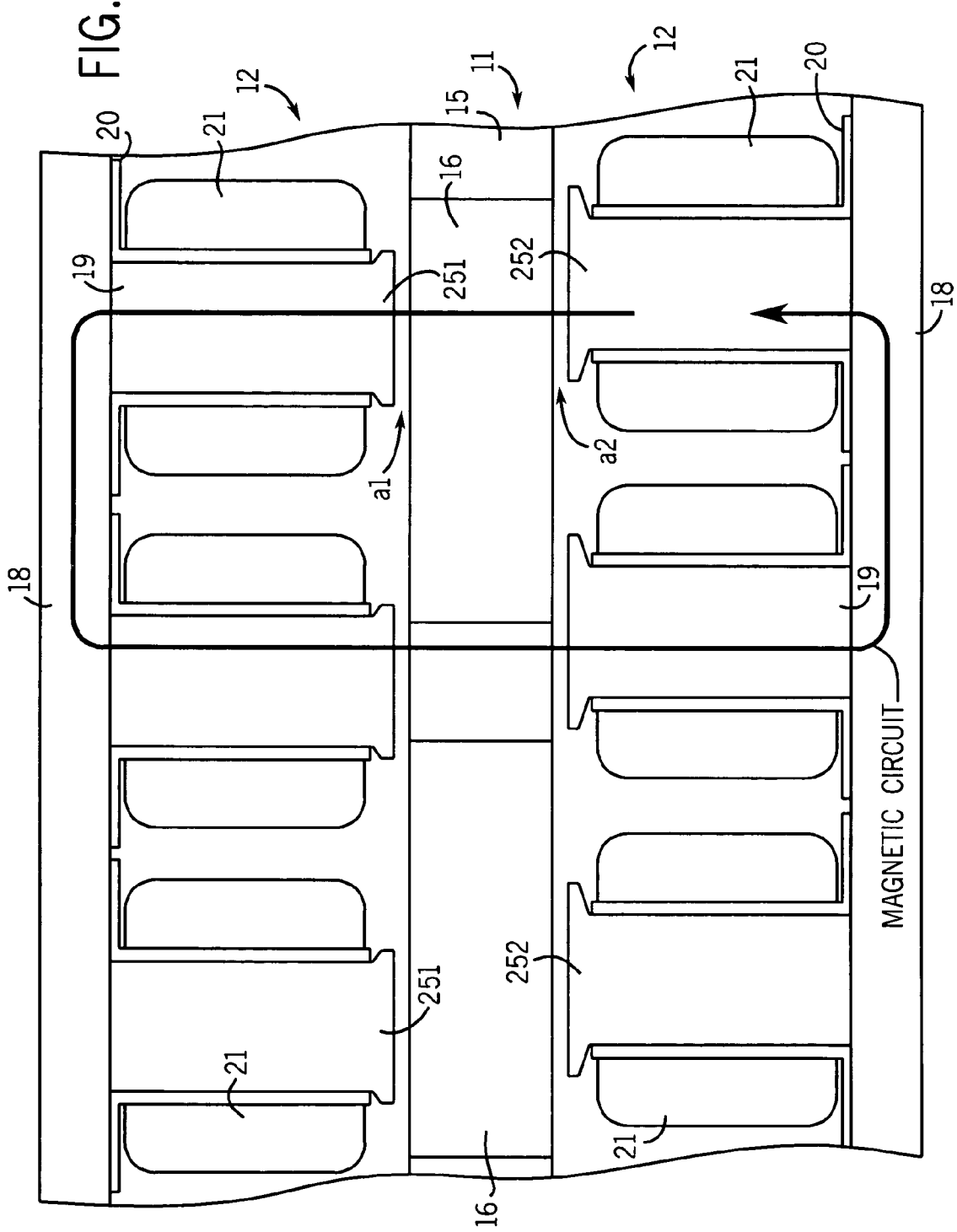
FIG. 5 is a development view illustrating a part of the stators which are placed on both sides of the rotor of the motor/generator of Embodiment 2 of the present invention.

FIG. 5 is a development view illustrating a second embodiment including a part of stators which are placed on both sides of the rotor of the motor/generator of Embodiment 2 of the present invention. As shown in FIG. 5, first protruding end part 251 which faces first air gap a1 in the side of one of stators 12 and second protruding end part 252 which faces second air gap a2 in the side of the other one of stators 12 are shaped differently. Also, each stator teeth 19 which is placed on both sides of rotor 11 is placed so that the center lines of each stator teeth 19 are not placed in the same line. As a result, it is possible to adjust the waveform of the cogging torque thereby decreasing the cogging torque.

Figure 6:
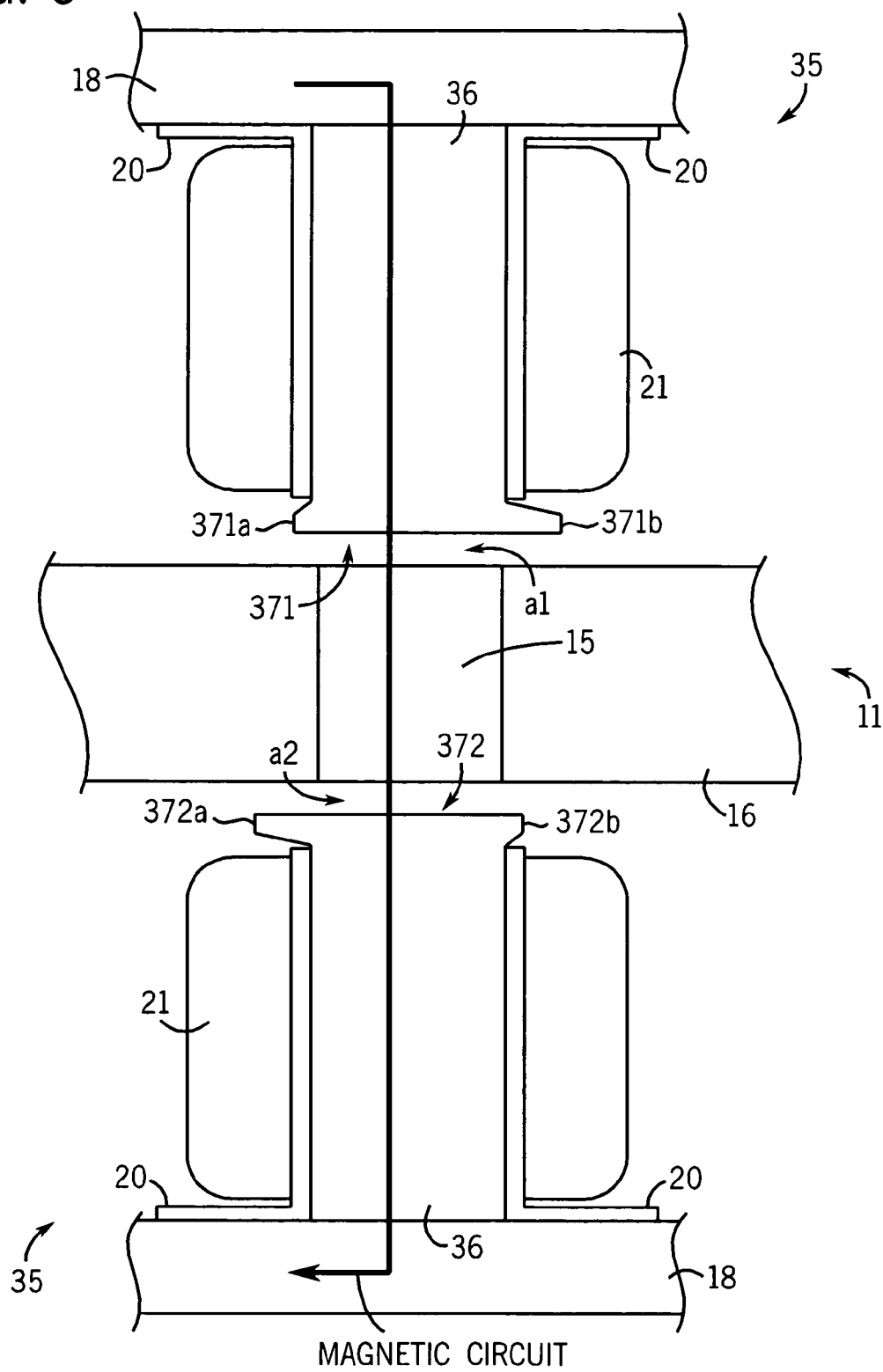
FIG. 6 is a cross-sectional view illustrating a part of the stators of the motor/generator of Embodiment 3 of the present invention in the direction of the diameter of the stators.

FIG. 6 is a cross-sectional view illustrating a third embodiment including part of the stators of the motor/generator of Embodiment 3 of the present invention in the direction of the diameter of the stators. As shown in FIG. 6, in one of stators 35, first protruding end part 371 which faces first air gap a1 of each stator teeth part 36 has different shapes on both sides (both edges) in the circumferential direction of the stator core (circumferential direction of the rotor). That is, the degree of outward protrusion is smaller on one side 371a in the circumferential direction of the rotor while the degree of outward protrusion is larger on the other side 371b. In the other one of stators 35, second protruding end part 372 which faces second air gap a2 of stator teeth part 36 has different shapes: the degree of onward protrusion is larger on one side 372a in the circumferential direction of the rotor while the degree of onward protrusion is smaller on the other side 372b.

As described above, each stator teeth part 36 is placed so that first protruding end part 371 which faces first air gap a1 in the side of one of stators 35 and second protruding end part 372 which faces second air gap a2 in the side of the other one of stators 35 have different shapes. As a result, it is possible to adjust the waveform of the cogging torque thereby further decreasing the cogging torque. In the magnetic circuit, the magnetic flux passes through first protruding end part 371, rotor 11 and second protruding end part 372 through first air gap a1 and second air gap a2 which are placed on different surfaces. Here, each of stator teeth parts 36 of a pair of stators 35, which is placed opposite to each other on both sides of rotor 11, is placed so that the center lines of each stator teeth part 36 become identical. However, the positions of the center lines may be different. Also, the width (width of the teeth) of first protruding end part 371 of each of the stator teeth part 36 which are placed opposite to each other is the same as the width of second protruding end part 372 in the circumferential direction of the rotor. However, the width may be different.

FIG. 7 is a development view illustrating a fourth embodiment including a part of the stators which are placed on both sides of the rotors of the motor/generator of Embodiment 4 of the present invention. As shown in FIG. 7, first protruding end part 251 which faces first air gap a1 in the side of one of stators 12 and second protruding end part 252 which faces second air gap a2 in the side of the other one of stators 12 have different shapes. Each of the protruding end parts 25 of stator teeth parts 19 which are placed adjacent to each other have different shapes in the circumferential direction of the stator core.

In other words, in each of stator teeth parts 19 which is placed opposite to each other on both sides of rotor 11, first protruding end part 251 has teeth width d1 while second protruding end part 252 has teeth width d2. In stator teeth parts 19 which are placed adjacent to each other in the circumferential direction of the stator core (circumferential direction of the rotor), protruding end parts 251 and 252 with teeth width d1 are placed alternately with protruding end parts 251 and 252 with teeth width of d2. As a result, it is possible to adjust the waveform of the cogging torque thereby further decreasing the cogging torque.

FIG. 8 is a development view illustrating a fifth embodiment including a part of the stators which are placed on both sides of the rotors of the motor/generator of Embodiment 5 of the present invention. As shown in FIG. 8, the motor/generator is comprised of one stator 45, two rotors 46 which are placed on both sides of the stator 45. The two rotors are connected with a same rotating axis so that they rotate together. Here, both of the edges of a plurality of stator teeth parts 47 face two air gap a1 and a2 which are created between stator 45 and each rotor 46.

Stator 45 has flange-shaped first protruding end part 491 and second protruding end part 492 on the end surfaces in the sides of air gaps a1 and a2 which are placed on both ends of each stator teeth part 47 around which coil 48 is wound. The width (teeth width) in the circumferential direction of the stator of first protruding end part 491 is different from the width of second protruding end part 492. Each of protruding end parts 491 and 492 which respectively faces two air gaps a1 and a2 has different shape. Each rotor 46 has disc-shaped rotor core 50 and a plurality of permanent magnets 51 which are mounted on rotor core 50 so that they are exposed in the sides of air gaps a1 and a2.

In other words, the above described motor/generator is comprised of one stator 45 and two rotors 46, has air gaps a1 and a2 in two places and first protruding end part 491 and second protruding end part 492 which face each of air gaps a1 and a2 have different shapes. As a result, it is possible to adjust the waveform of the cogging torque thereby decreasing the cogging torque.

As described above, according to the present invention, in the stator of a motor/generator which is created by winding a coil around a plurality of stator teeth parts and has air gaps between the stator and a rotor where a permanent magnet is mounted, a plurality of air gaps are created, protruding end parts which are placed opposite to each other facing each air gap of each stator teeth part have different shapes. As a result, it is possible to obtain an effect of significantly decreasing the cogging torque without increasing the size and cost of the stator.

Here, in the above described embodiments, the motor/generator has two air gaps a1 and a2 which are created between the rotor and the stator. However, the number of these air gaps is not limited to two and the motor/generator may have three or more air gaps. The motor/generator may be an electric motor or electric generator and the number of the poles is not limited. Moreover, although the present invention is described based on an axial gap motor, it is possible to use a radial gap motor. Also, the present invention uses a structure where the number of the stator is two and the number of the rotor is one, or the number of stator is one and the number of the rotor is two. However, it is possible to combine several of the above described structures.

Various embodiments of the invention have been described. These and other embodiments are within the scope of the following claims.

The invention claimed is:

1. A motor/generator comprising:
one or more rotors having a permanent magnet; and
one or more stators forming a plurality of stator teeth parts, the stator teeth parts of the one or more stators including:
a plurality of first protruding end parts that faces a first surface of the one or more rotors via a first air gap; and
a plurality of second protruding end parts that faces a second surface of the one or more rotors via a second air gap with a total number of the second protruding end parts being equal to a total number of the first protruding end parts, and each of the second protruding end parts having a shape in a circumferential direction of the one or more rotors that is different from a shape of a corresponding one of the first protruding end parts in the circumferential direction of the one or more rotors; and
a coil mounted on each of the stator teeth parts that creates a magnetic circuit via a magnetic field generated by the permanent magnet and the coil, the one or more stators creating the magnetic circuit passing through the first air gap and the second air gap so that the magnetic field passes through at least one of the first protruding end parts and at least one of the second protruding end parts.

2. The motor/generator of claim 1, wherein
a width of each of the second protruding end parts in the circumferential direction of the one or more rotors is different from a width of a corresponding one of the first protruding end parts.

3. The motor/generator of claim 1, wherein
a degree of protrusion of each of the first protruding end parts towards a first side of the circumferential direction of the one or more rotors is smaller than a degree of protrusion towards a second side of the circumferential direction of the one or more rotors, and a degree of protrusion of each of the second protruding end parts towards the first side of the circumferential direction of the one or more rotor is larger than a degree of protrusion towards the second side of the circumferential direction of the rotor.

4. The motor/generator of claim 1, wherein
the one or more stators comprises first and second stators, with the first stator having the stator teeth parts with the first protruding end parts arranged in the circumferential direction of the one or more rotors and the second stator having the stator teeth parts with the second protruding end parts arranged in the circumferential direction of the one or more rotors, each of the first protruding end parts having the same shape in the circumferential direction of the rotor, and each of the second protruding end parts having the same shape in the circumferential direction of the rotor.

5. The motor/generator of claim 1, wherein
the one or more stators comprises first and second stators, with the first stator having the stator teeth parts with the first protruding end parts arranged in the circumferential direction of the one or more rotors and the second stator having the stator teeth parts with the second protruding end parts arranged in the circumferential direction of the one or more rotors, adjacent ones of the first protruding end parts having different shapes, and adjacent ones of the second protruding end parts having different shapes.

6. The motor/generator of claim 1, wherein
the one or more stators comprise two stators positioned opposite to each other on both sides of one rotor, and each of the two stators includes the stator teeth parts arranged in the circumferential direction of the one rotor and the center lines of the stator teeth parts disposed opposite to each other are placed in the same position.

7. The motor/generator of claim 1, wherein
a size of each of the first protruding end parts is within a range such that a distance between adjacent permanent magnets divided by the width of the first protruding end part is less than 0.5.

8. The motor/generator of claim 1, wherein
the one or more rotors equals one rotor when the one or more stators equals two stators.

9. The motor/generator of claim 1, wherein
the one or more rotors equals two rotors when the one or more stators equals one stator to create the first and second air gaps.

10. A method for generating a magnetic field, the method comprising:
rotating one or more rotors separated from one or more stators by a first air gap and a second air gap disposed in different surfaces between the one or more rotors and the one or more stators, with a plurality of first protruding end parts facing a first surface of the one or more rotors via the first air gap and a plurality of second protruding end parts facing a second surface of the one or more rotors via the second air gap with a total number of the first protruding end parts being equal to a total number of the second protruding end parts, and each of the second protruding end parts having a shape in the circumferential direction of the one or more rotor that is different from a shape of a corresponding one of the first protruding end parts in the circumferential direction of the one or more rotors; and
creating a magnetic circuit with a coil mounted on each of a plurality of stator teeth parts of one or more stators and a permanent magnet of one or more rotors via a magnetic field generated by the permanent magnet and the coil, with the magnetic circuit passing through the first and second air gaps, at least one of the first protruding end parts and at least one of the second protruding end parts.

11. The method of claim 10, wherein
rotating one or more rotors comprises rotating one rotor between two stators.

12. The method of claim 10, wherein rotating one or more rotors comprises
rotating two rotors on either side of one stator.

13. The method of claim 10, wherein
the magnetic circuit is created with a width of each of the second protruding end parts in the circumferential direction of the one or more rotors being different from a width of a corresponding one of the first protruding end parts.

14. The method of claim 10, wherein
the magnetic circuit is created utilizing a degree of protrusion of each of the first protruding end parts towards a first side of the circumferential direction of the one or more rotors that is smaller than a degree of protrusion towards a second side of the circumferential direction of the one or more rotors and a degree of protrusion of each of the second protruding end parts towards the first side of the circumferential direction of the one or more rotor that is larger than a degree of protrusion towards the second side of the circumferential direction of the rotor.

15. The method of claim 10, wherein
the magnetic circuit is created with first and second stators of the one or more stators, with the first stator having the stator teeth parts with the first protruding end parts arranged in the circumferential direction of the one or more rotors and the second stator having the stator teeth parts with the second protruding end parts arranged in the circumferential direction of the one or more rotors, each of the first protruding end parts having the same shape in the circumferential direction of the rotor, and each of the second protruding end parts having the same shape in the circumferential direction.

16. The method of claim 10, wherein
the magnetic circuit is created with first and second stators of the one or more stators, with the first stator having the stator teeth parts with the first protruding end parts arranged in the circumferential direction of the one or more rotors and the second stator having the stator teeth parts with the second protruding end parts arranged in the circumferential direction of the one or more rotors, adjacent ones of the first protruding end parts having different shapes, and adjacent ones of the second protruding end parts having different shapes.

17. The method of claim 10, wherein
the magnetic circuit is created with two stators positioned opposite to each other on both sides of one rotor, and each of the two stators comprises the stator teeth parts arranged in the circumferential direction of the one rotor and the center lines of the stator teeth parts disposed opposite to each other are placed in the same position.

18. The method of claim 10, wherein
the magnetic circuit is created utilizing a size of each of the first protruding end parts that is within a range such that the distance between adjacent permanent magnets divided by the width of the first protruding end part is less than 0.5.

* * * * *